Figure 1:
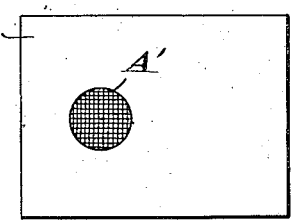

Nov. 3, 1925.  1,559,674

A. W. CARPENTER

COLOR MOTION PICTURE PHOTOGRAPHY

Filed Jan. 18, 1923    2 Sheets-Sheet 1

INVENTOR
Arthur W. Carpenter
BY
ATTORNEYS

Nov. 3 1925.                                                              1,559,674
                            A. W. CARPENTER
                     COLOR MOTION PICTURE PHOTOGRAPHY
                      Filed Jan. 18, 1923         2 Sheets-Sheet 2
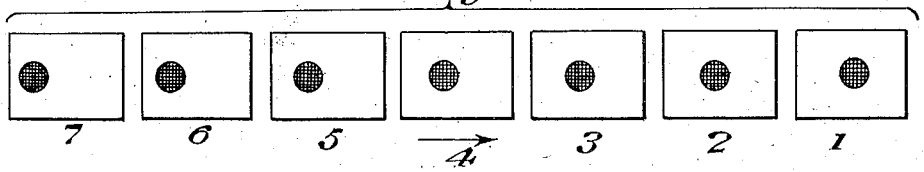
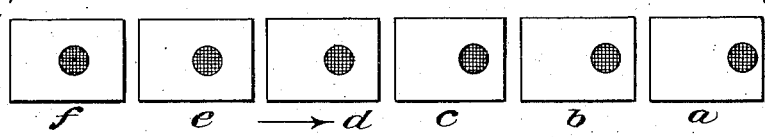
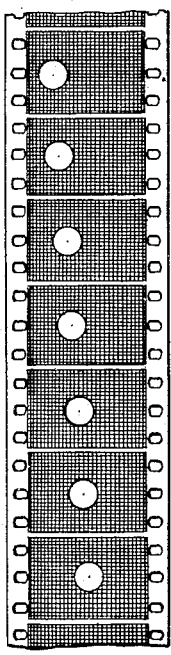
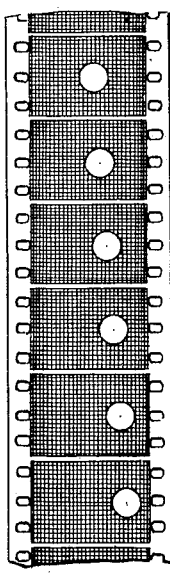
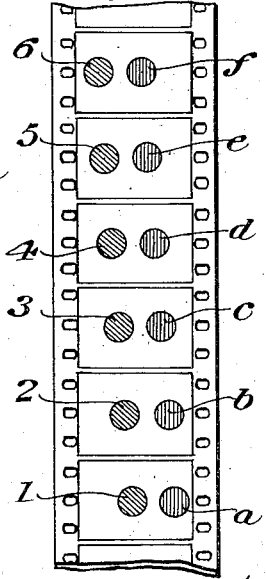
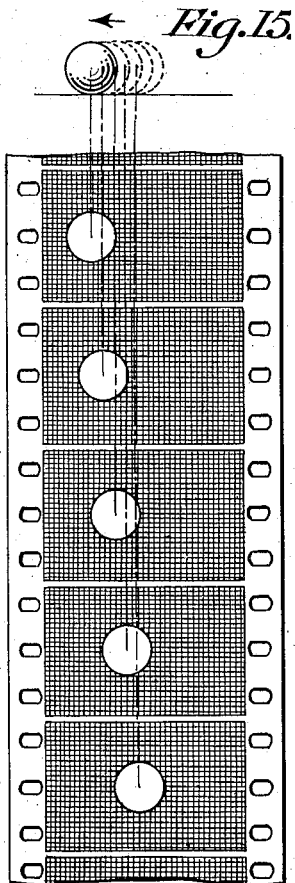
INVENTOR
Arthur W. Carpenter
BY
ATTORNEYS Patented Nov. 3, 1925.

1,559,674

UNITED STATES PATENT OFFICE.

ARTHUR W. CARPENTER, OF NEW YORK, N. Y.

COLOR MOTION-PICTURE PHOTOGRAPHY.

Application filed January 18, 1923. Serial No. 613,405.

*To all whom it may concern:*

Be it known that I, ARTHUR W. CARPENTER, a citizen of the United States, and resident of the borough of Bronx, in the county of Bronx, city and State of New York, have invented certain new and useful Improvements in Color Motion-Picture Photography, of which the following is a specification.

It is the purpose and object of this process of color photography to produce, by the proper manipulation and photography of colorless objects, or of objects which do not in themselves present the colors desired in the final positive, a color-sensation negative in monochrome the various areas of which, expressed in intensities and mixtures of the color mediums used to print them, shall present an untrue and entirely arbitrary-color positive record of the original objects.

In extension of the arbitrary nature of the colors presented by positives printed from negatives thus prepared it is a further object of this process to so manipulate the objects and the photography thereof as to cause the objects to appear in the final color positives enhanced by predetermined colors which were not presented by the original objects.

It is an essential to the operation of most processes of color photography that a careful quantitative relation be maintained between the original object and the resulting negative image areas, and to this end color filters or selective color screens are variously interposed in the optical taking systems during the exposure of the negatives. To accomplish this special apparatus is usually required.

It is a feature of this process that no effort is made to preserve a careful quantitative relation between the object and the resulting negative image areas, and hence the use of selective filters is dispensed with and no special apparatus is required.

It is an essential to the operation of most processes of color photography that negative emulsions of a wide scale of tonal values and of special and predetermined color sensitiveness be employed, thereby restricting the available emulsions to those generally designated as panchromatic, orthochromatic, and the like.

It is a feature of this process that the tonal value scale of the negative emulsion is largely immaterial and color sensitiveness is not requisite so that the choice of emulsions is not restricted and ordinary emulsions may be used.

Figure 5:
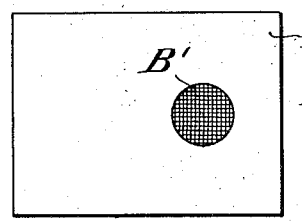
Figure 2:
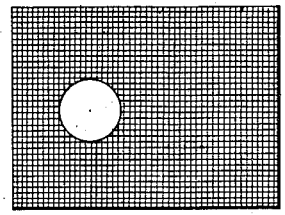
Figure 6:
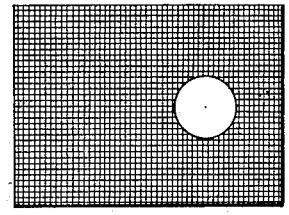
Figure 3:
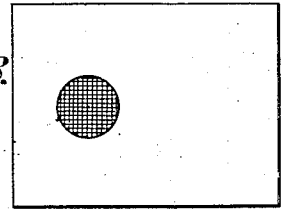
Figure 7:
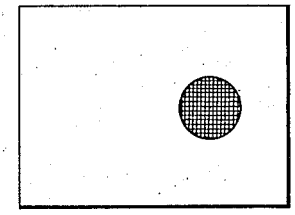
Figure 4:
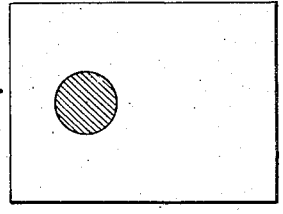
Figure 8:
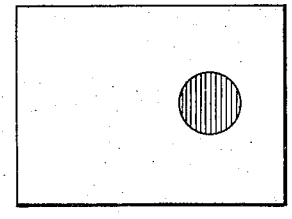
Figure 9:
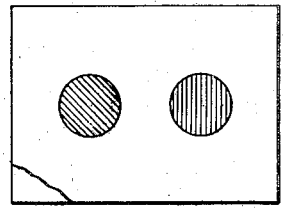

In the drawings, Fig. 1 represents a drawing of a card showing a black, round spot or target thereon;

Fig. 2 an ordinary photograph negative of the card illustrated in Fig. 1;

Fig. 3 a positive print from the negative shown in Fig. 2, made on an ordinary emulsion film;

Fig. 4 a view of the print shown in Fig. 3, showing the photographic reproduction of the round spot or target colored green;

Fig. 5 a drawing similar to Fig. 1, showing the round spot or target in a different position from that shown in Fig. 1;

Fig. 6 an ordinary photographic negative of the card illustrated in Fig. 5;

Fig. 7 a positive print from the negative shown in Fig. 6, made on an ordinary emulsion film;

Fig. 8 a view of the print shown in Fig. 7, showing the photographic reproduction of the spot or target colored red;

Fig. 9 a view showing the colored positive prints illustrated in Figs. 4 and 8 superimposed to form a single structure bearing the targets colored red and green;

Fig. 10 illustrates a series of drawings having a round spot or target placed in a different position in each drawing;

Fig. 11 a section of a motion picture negative film bearing photographic reproductions of the cards shown in Fig. 10, said reproductions being shown in sequence;

Fig. 12 illustrates a series of drawings having a round spot or target placed in a different position in each drawing, and all of the spots being different in position from the spots illustrated in Fig. 10;

Fig. 13 a section of a motion picture negative film bearing photographic reproductions of the cards shown in Fig. 12, said reproductions being shown in sequence;

Fig. 14 a view of a section of a motion picture film showing the positive prints made from the negatives illustrated in Figs. 11 and 13 superposed and colored red and green; and Fig. 15 a section of a motion picture film bearing a series of photographic reproductions of a moving ball.

In the actual operation of this process any selected objects may be used as originals, either solid objects, pictures or drawings of objects, or optically produced images of objects. Since, however, the process finds its most convenient application in the photographic reproduction of drawings and diagrams in two or more colors, a typical case will be first described, in which it is desired to produce a photographic presentation of rectangular charts exhibiting two round spots or targets each in a separate color, one in green and the other in red.

Figs. 1 and 5 represent drawings of two cards A and B. The card A bears a representation of a black, circular target A', and the card B bears a similar representation of a black, circular target B'. The targets A' and B' are differently spaced on their respective cards. Figs. 2 and 6 represent photographic negative reproductions of the cards illustrated in Figs. 1 and 5. The white card, of course, gives a substantially black or opaque background in the negative, while the black target A' is represented by a substantially transparent or clear space in the negative film. Figs. 3 and 7 illustrate positive prints from the negatives 2 and 6, in which the black circles are positive photographic reproductions of the black circles illustrated in Figs. 1 and 5. These positive reproductions may be made on separate and independent single-emulsion coated positive films, or they may be printed on the ordinary double-emulsion coated positive film. These positive prints are now toned or dyed for color, and any desired color may be arbitrarily selected. As illustrated, the print represented in Fig. 4 has been toned for green, while the print represented in Fig. 8 is toned red. Fig. 9 illustrates the two toned prints of Figs. 4 and 8 superposed on a single positive film. If the prints 4 and 8 are made on separate films the two films are brought together and cemented in the usual way, so that they may be handled through the projection machine as a single film. If the two prints 4 and 8 are made on a double-emulsion coated positive film, each print is made and toned or dyed or otherwise colored separately. The result of these two manipulations, however, is substantially the same as producing a single positive film bearing the targets colored red and green. Such a film is adapted for use in an ordinary motion picture projecting apparatus and the targets will be projected on the screen colored red and green. It is, of course, manifest, that any other colors may be arbitrarily selected and that the color finally given to the object photographed bears no necessary relation to the color of the original object. As described herein the original drawings were black. If desired for convenience or effect the original drawings might be made in any selected color or colors and the final color in the positive film need bear no relation whatever to the color of the original object photographed.

This invention is especially applicable to motion pictures in colors in which the motion effect is secured by means of a multiplicity of drawings, each drawing being slightly different from the other and showing a slight progress in the motion of the object photographed. In Fig. 10 is shown a series of drawings illustrating the movement of a black target from right to left. These drawings are, for convenience, numbered 1 to 7 inclusive. It will be noted that the black target occupies a different place on each card illustrated. In Fig. 11 is shown a section of a photographic negative motion picture film bearing photographic reproductions of the seven cards illustrated in Fig. 10. The picture areas on the film are numbered 1 to 7 inclusive to correspond with the numbering of the cards illustrated in Fig. 10. The arrow in Fig. 11 illustrates the direction of motion of the negative film during the operation of taking the pictures; and the arrow in Fig. 10 shows the direction of the assumed movement of the series of cards through the camera or the sequence in which the cards are placed in the camera. When the negative film is completed a print of said film is made on a positive film, either a single-emulsion coated film or on a double-emulsion coated film. After said positive is printed it is toned or dyed the desired color.

In Fig. 12 is shown another series of drawings illustrating the movement of a black target from right to left. These drawings are, for convenience, lettered a to f inclusive. It will be noted that the black target occupies a different place on each card illustrated, and that the positions of the targets on the cards illustrated in Fig. 12 are different from the positions of the targets on the cards illustrated in Fig. 10. In Fig. 13 is shown a section of a photographic negative motion picture film bearing photographic reproductions of the cards illustrated in Fig. 12. The picture areas on the film are lettered a to f inclusive to correspond with the lettering of the cards illustrated in Fig. 12. The arrow in Fig. 13 illustrates the direction of motion of the negative film during the operation of taking the pictures; and the arrow in Fig. 12 shows the direction of the assumed movement of the series of cards through the camera or the sequence in which the cards are placed in the camera. When the negative film illustrated in Fig. 13 is completed a print of said film is made on a positive film, either a single-emulsion coated film or on a double-emulsion coated film. After said positive print is fixed and dried it is toned or dyed the desired color.

If the prints from the negative films illustrated in Figs. 11 and 13 are on single-emulsion coated films the two films are secured together by cementing or otherwise to produce a film which may be handled through the ordinary motion picture projecting machine. If the two prints are made upon a double-emulsion coated film the two prints are toned or colored separately. In either event the completed product is a positive film substantially as illustrated in Fig. 14, bearing two series of pictures of the targets illustrated in Figs. 10 and 12. As illustrated in Fig. 14 the targets shown in Fig. 10 are colored green, while the targets illustrated in Fig. 12 are colored red. This finally completed film may be used in the ordinary motion picture projecting machine and will produce the effect of movement of red and green spots or balls, both of said balls moving together from right to left.

It is, of course, obvious that this process may be applied to pictures of moving objects. In Fig. 15 is illustrated a section of a motion picture negative film bearing a series of pictures of a ball moving from right to left. In this application of the process the color of the object in the finally completed positive film may be arbitrarily selected and need bear no relation to the color of the object actually photographed.

It is manifest from the foregoing that I provide a very simple method of producing motion pictures in colors without the use of special photographic apparatus, in which the colors may be arbitrarily selected and in which the final coloring of the positive film need not be a true reproduction of the color of the original object, or even a simulation thereof. I thus avoid difficulties inherent in the now known methods of producing motion pictures in colors.

It is to be understood that while the process is described herein as applied to a two color scheme it may be carried out with a three color scheme, being only necessary to make a negative and a positive print for each color. It will also be understood that the final color of the positive prints may be done in any of the well known ways by dyeing or toning.

What I claim is:

1. The method of making pictures in a plurality of colors for projection upon a viewing screen, consisting of making a plurality of photographic negatives by taking a separate exposure of each of a plurality of objective views each of said views representing a different portion of a complete view that is to appear in the completed picture, making a separate positive print from each of said negatives, independently coloring each of said prints with a different arbitrarily selected color, whereby that part of each print forming a part of the picture will be distinctively colored, and superposing said prints to form a single picture area upon material permitting the passage of light.

2. The method of making pictures in a plurality of colors for projection upon a viewing screen, consisting of making a plurality of photographic negatives by taking a separate exposure of each of a plurality of objective views each of said views representing a different portion of a complete view that is to appear in the completed picture, making a separate positive print from each of said negatives, and arbitrarily toning or coloring one of said positive prints, all of said positive prints being superposed in proper register upon material permitting the passage of light to form a complete positive picture having a portion thereof colored.

3. The method of making pictures in a plurality of arbitrarily selected colors for projection on a viewing screen consisting in making a photographic negative for each color said negative showing only that portion of the picture intended to bear a single selected color, whereby a plurality of negatives will be taken of each picture each negative representing an area of one color; making separate positive prints from each of said negatives all of said prints being designed to occupy a single picture area in the completed positive print; and arbitrarily coloring each of the prints from the negatives whereby the completed positive print will be a plurality of prints from a plurality of independent negatives each of said prints bearing an arbitrarily selected color and all of said prints occupying a single picture area.

4. The method of making pictures in a plurality of arbitrarily selected colors for projection on a viewing screen consisting in making a drawing of each part of the picture to be given a selected color, photographing each of said drawings separately to produce an independent negative of each drawing, making a positive print from each of said negatives, separately toning or coloring each of said positive prints with the desired arbitrarily selected color, all of said positive prints being superposed to form a single picture area.

5. The method of making motion pictures in a plurality of arbitrarily selected colors for projection on a viewing screen consisting in making a plurality of sets of drawings each set illustrating that part of the completed picture to be given a selected color and the drawings of each set being varied to illustrate the motion of that portion of the picture, photographing each of the drawings in each set separately and in proper sequence to produce an independent negative film of each set of drawings, said photographs being properly arranged on the negative to indicate on the viewing screen the motion of that part of the picture, making a positive print on a film from each of said negatives, and separately toning or coloring each of said positive prints with the desired arbitrarily selected color, all of said differently colored positive prints being superposed with all parts of the pictures in proper sequence and register to form a single positive film having a series of complete pictures colored with a plurality of arbitrarily selected colors.

6. The method of making motion pictures in a plurality of arbitrarily selected colors for projection on a viewing screen consisting in making a plurality of sets of drawings each set illustrating that part of the completed picture to be given a selected color and the drawings of each set being varied to illustrate the motion of that portion of the picture, photographing each of the drawings in each set separately and in proper sequence to produce an independent negative film of each set of drawings, said photographs being properly arranged on the negative to indicate on the viewing screen the motion of that part of the picture, making a positive print on a multi-emulsion coated film from each of said negatives and separately toning or coloring each of said positive prints with the desired arbitrarily selected color, all of said differently colored positive prints being superposed with all parts of the picture in proper sequence and register to form a single positive film having a series of complete pictures colored with a plurality of arbitrarily selected colors.

7. The method of making motion pictures in a plurality of arbitrarily selected colors for projection on a viewing screen consisting in making two sets of drawings each set illustrating that part of the completed picture to be given a selected color and the drawings of each set being varied to illustrate the motion of that portion of the picture, photographing each of the drawings in each set separately and in proper sequence to produce an independent negative film of each set of drawings, said photographs being properly arranged on the negative to indicate on the viewing screen the motion of that part of the picture, making a positive print on a double-emulsion coated film from each of said negatives, and separately toning or coloring each of said positive prints with the desired arbitrarily selected color, both of said differently colored positive prints being superposed with all parts of the pictures in proper sequence and register to form a single positive film having a series of complete pictures colored with two arbitrarily selected colors.

8. The method of making pictures in two arbitrarily selected colors for projection on a viewing screen consisting in making two drawings, each drawing illustrating that part of the completed picture to be given a selected color, photographing each of the drawings separately to produce an independent negative film of each drawing, making a positive print on a double-emulsion coated support from each of said negatives and separately toning or coloring each of said positive prints with the desired color, all of said differently colored positive prints being superposed with all parts of the picture in proper register to form a single positive complete picture colored with a plurality of arbitrarily selected colors and adapted for projection on a viewing screen.

9. The method of making motion pictures in a plurality of arbitrarily selected colors for projection on a viewing screen consisting in making a plurality of negatives illustrating the motion of the object photographed, each negative showing only that portion of the object intended to bear a single selected color whereby a plurality of negatives will be taken, each negative bearing a series of pictures illustrating the motion of the part of the object photographed and representing an area of one color, making a positive print on a film from each of said negatives and separately toning or coloring each of said positive prints with the desired arbitrarily selected color, all of said differently colored positive prints being superposed with all parts of the prints in proper sequence and register to form a single positive film having a series of pictures of the complete object colored with a plurality of arbitrarily selected colors and adapted for projection on a viewing screen.

10. The method of making pictures for projection on a viewing screen consisting of making a plurality of photographic negatives each negative showing only a portion of the picture whereby a plurality of negatives will be made of each picture, making a separate positive print from each of said negatives all of said prints being designed to occupy a single picture area in the completed positive print and arbitrarily coloring one of said positive prints, all of said positive prints being superposed in proper register to form a complete positive picture having a portion thereof arbitrarily colored.

In testimony whereof I hereunto affix my signature.

ARTHUR W. CARPENTER.